US007487248B2

(12) United States Patent
Moran et al.

(10) Patent No.: US 7,487,248 B2
(45) Date of Patent: Feb. 3, 2009

(54) METHOD AND SYSTEM FOR TRANSFERRING A COMPUTER SESSION BETWEEN DEVICES

(76) Inventors: Brian Moran, 308th Ave. SE., Preston, WA (US) 98050; David A. Feinleib, 65 Kirkland Ave. #313, Kirkland, WA (US) 98033

( * ) Notice: Subject to any disclaimer, the term of this patent is extended or adjusted under 35 U.S.C. 154(b) by 572 days.

(21) Appl. No.: 10/266,908

(22) Filed: Oct. 8, 2002

(65) Prior Publication Data

US 2004/0068567 A1 Apr. 8, 2004

(51) Int. Cl.
*G06F 13/00* (2006.01)
(52) U.S. Cl. .................................. 709/227; 709/206
(58) Field of Classification Search ................ 709/227, 709/228, 220–222, 206
See application file for complete search history.

(56) References Cited

U.S. PATENT DOCUMENTS

| | | | | |
|---|---|---|---|---|
| 6,990,513 | B2 * | 1/2006 | Belfiore et al. | 709/203 |
| 2002/0059425 | A1 * | 5/2002 | Belfiore et al. | 709/226 |
| 2002/0062345 | A1 * | 5/2002 | Guedalia et al. | 709/204 |
| 2003/0055977 | A1 * | 3/2003 | Miller | 709/227 |
| 2003/0088676 | A1 * | 5/2003 | Smith et al. | 709/227 |
| 2003/0154398 | A1 * | 8/2003 | Eaton et al. | 713/201 |
| 2003/0195963 | A1 * | 10/2003 | Song et al. | 709/227 |
| 2005/0033843 | A1 * | 2/2005 | Shahi et al. | 709/226 |

FOREIGN PATENT DOCUMENTS

EP 1330098 A1 * 7/2003

OTHER PUBLICATIONS

Alexandre S. Pinto et al.; TINA-Based Environment for Mobile Multimedia Services; Telecommunications Information Networking Architecture Conference Proceedings, 1999, TINA '99; pp. 54-65; Apr. 1999.*

(Continued)

*Primary Examiner*—Kenneth R Coulter
(74) *Attorney, Agent, or Firm*—Law Office of R. Alan Burnett (57) ABSTRACT

A method and system for transferring a computer session between devices, such as a land-line device to a wireless device. A user launches a computer session on a first device, such as a personal computer. The user may then selectively transfer the computer session to another device, such as a wireless device, through activation of a triggering signal or other transfer request means. In response, the context of the computer session is determined as it is being performed on the first device, and corresponding context data is transferred to the second device. An applicable application on the second device is opened and loaded with applicable context data to continue the session. Several session transfer mechanisms, including use of an online service, proxy mechanisms, and peer-to-peer communication links, are disclosed.

42 Claims, 7 Drawing Sheets

OTHER PUBLICATIONS

Thomas Phan et al.; Handoff of Application Sessions Across Time and Space; Proceedings of the IEEE International Conference on Communications, 2001; pp. 1367-1372; Jun. 2001.*

Thomas Phan et al.; A New TWIST on Mobile Computing: Two-Way Interactive Session Transfer; Proceedings of the Second IEEE Workshop on Internet Applications, 2001; pp. 2-11; Jul. 2001.*

Henry Song et al.; Browser Session Preservation and Migration; In Poster Session of WWW 2002, Hawaii; May 11, 2002.*

Henry Song et al.; Browser State Respository Service; DoCoMo Communications Laboratories USA, Inc.; Proceedings of Pervasive Computing : First International Conference, Pervasive 2002, Zürich, Switzerland; Aug. 28, 2002.*

Hao-Hua Chu et al.; Seamless Applications over Roam System; DoCoMo Communications Laboratories USA, Inc.; UBIComp '01; Sep. 2001.*

* cited by examiner

METHOD AND SYSTEM FOR TRANSFERRING A COMPUTER SESSION BETWEEN DEVICES

BACKGROUND OF THE INVENTION

1. Field of the Invention

The present invention generally concerns online communications sessions, and in more particular concerns a method and system for transferring a computer session from a stationary device, such as a computer or Internet-enabled Television), to a mobile device, such as an Internet-enabled wireless phone or PDA.

2. Background Information

Many people now use electronic communications, such as email and instant messaging, as their primary means of communication with others. With recent advances in network and wireless technologies, an ever increasing number of people are now using text messaging and Internet access via Internet-enabled mobile phones, wireless PDA's (personal digital assistant devices, such as a Palm VII, a wireless-enabled Handspring Visor, wireless pocket PCs) or data capable pagers such as the Research in Motion Blackberry pagers, etc.

A common problem in today's fast-paced world is the need to pick up and go on a moment's notice. Oftentimes, a person is doing something on their personal computer (PC) or workstation, such as writing an e-mail message or interacting with another via a chat session, and needs to leave their work area to attend a meeting, drive somewhere, etc. (Reference throughout this specification to "chat session" is indicated to mean either a chat session taking place in a chat room, e.g. an online communications room capable of allowing communication between numerous participants, or to an instant message dialog, a dialog taking place between two people via an instant messaging application). Unfortunately, this typically requires the person to save the e-mail message to be completed later or drop the chat session. One option is to continue preparing the e-mail message or rejoin the chat or instant message session via one of the wireless Internet-enabled devices discussed above. However, this process typically requires saving a draft of the e-mail message, re-logging onto a network, opening up an appropriate application, reloading the draft or rejoining the chat session, etc., to continue where the person left off, which is both a time-consuming and difficult process. In addition, the context (e.g. history, past text, configuration settings, etc.) of the communication is typically lost in the process, especially in a chat or instant message dialog.

SUMMARY OF THE INVENTION

The present invention provides a method and system for enabling a user to selectively transfer a computer session between two devices. In a typically implementation, the user will desire to transfer a computer session between a land-line computer, such as a personal computer, workstation, laptop, or set-top box device, to a wireless device, such as a wireless phone, PDA, pager, Blackberry device, pocket PC, or a laptop with a wireless modem.

In accord with the method, a user launches a computer session on a first device, such as his personal computer. The user may then selectively transfer the computer session to another device, such as his wireless device, through activation of a triggering signal. Typically, the triggering signal may be a user-interface control provided by an application the user is running to participate in the computer session, or it may be a hard or soft key or key sequence on the wireless device. In response to the triggering signal, the context of the computer session is determined as it is being performed on the land-line device, including a type of the computer session. The computer session is then transferred to the wireless device by launching a new computer session on the wireless device and transferring the context of the computer session corresponding to the land-line device to the new computer session computer session on the wireless device. If the computer session is an online session, a network connection (e.g., wireless internet connection) is automatically established on the wireless based on session context information determined above, such as the user's userID and password. Optionally, this information may be provided via a database maintained by an online service provider, or through use of a proxy service. In the case of offline computer session, a peer-to-peer communication link, such as an infrared link, serial link, USB link, wireless Bluetooth link, or wireless 802.11 link may be used to transfer information pertaining to the context of the computer session.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION

The present invention provides a system and method for transferring a computer session between two devices, such as between a land-line device (e.g., personal computer or workstation), and a wireless device (e.g., wireless phone, PDA, pocket PC, or pager). In the following description, numerous specific details are provided, to provide a thorough understanding of embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
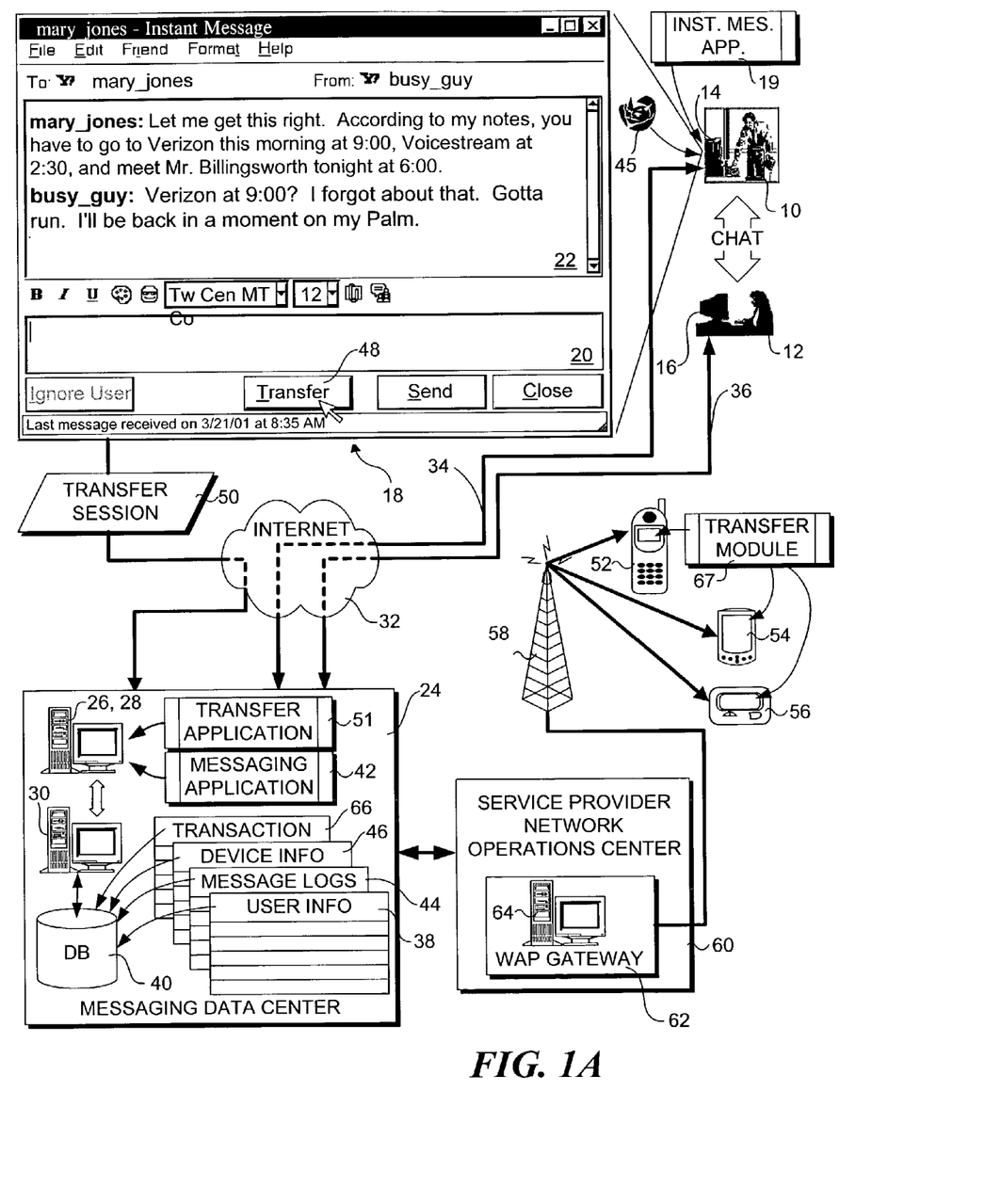
FIG. 1A is a schematic diagram illustrating a first system infrastructure for implementing transfer of a chat session in accord with the present invention.

Various aspects of a first exemplary system infrastructure for implementing the present invention are depicted in FIG. 1, wherein an online chat session is being conducted by a businessman 10 and his secretary 12, using an instant messaging service. Initially, businessman 10 and secretary 12 conduct the chat session from computers 14 and 16, which are located in their respective offices. In the present example the chat session is facilitated by instant messaging services provided by Yahoo. Similar instant messaging services are provided by AOL (America Online), MSN (Microsoft Network), and ICQ.

During a conventional chat session, two or more chat participants are enabled to send instant messages to the other chat participants by entering text at their computers and activating a "send" button. As the participants send messages back and forth, a running dialog corresponding to the messages are displayed in an application window running on their computers. For example, as depicted in an instant messaging application window 18 corresponding to an instant messaging application 19, a user is enabled to enter new messages in an edit box 20, and view the running dialog in a text box 22.

Instant messaging is facilitated by a messaging data center 24 operated by the instant messaging service provider being used. For instance, Yahoo, AOL, MSN and ICQ all have there own messaging data centers. Each messaging data center typically will includes one or more application servers 26, as well as web servers 28 (see FIG. 1B) and database servers 30, which enable the chat participants to communicate via Internet 32, as depicted by bi-directional communication paths 34 and 36.

A typical instant messaging session works as follows. A user, such as businessman 14, connects to Internet 32, opens up his instant messaging application 19, and logs on. This sends a logon message to messaging data center 24, which identifies the user based on a userID (i.e., user alias) and password, which the user provided when he logged on. Optionally, this information may be passed to messaging data center 24 based on user authentication information entered in a corresponding logon, such as via an MSN passport account that provides logon credentials for both MSN hotmail accounts and MSN instant messaging. The user ID and password information is stored in a user information table 38, which is part of a database 40 operating on database server 30. In addition to the user's own information, user information table 38 also contains information pertaining to other users who are members of the user's "chat list" or "buddy" list. In general, chat lists comprise a list of user aliases corresponding to other users the user prefers to chat with. One advantage to maintaining chat lists is that a user can open a chat session and automatically send messages to other users who are a member of his chat list to inform them that the user has opened a chat session and they are invited to join it. For instance, in the present example, when businessman 10 opens a new chat session, a message is sent to secretary 12 informing her that businessman 10 has invited her to join the chat session.

Once secretary 12 (and possibly others) join the chat session, they can send instant messages to one another via their respective edit boxes 22. This is facilitated, in part, by a messaging application 42 running on application server 26. Messaging application 42 sends messages to the users participating in the chat session. More specifically, these messages are sent to and received from IP addresses corresponding to the network location of the device each participant is using. The identities of the chat session participants are recorded in a message log table 44 stored in database 40. As the users join the chat session, the IP addresses of their computers are detected and entered into message log table 44, thereby enabling web server 28 to know what IP addresses to send the messages to.

Instant messaging application window 18 depicts an exemplary chat session between businessman 10 and secretary 12, whose user aliases are busy_guy and mary_jones, respectively. Suppose that businessman 10 suddenly has to leave to make a business appointment, as indicated by the chat session text in text box 20. As discussed above, in order to maintain communication with secretary 12, businessman 10 would normally have to end the chat session, and open a new chat session (or rejoin the existing chat session) using a different device, such as an Internet-enabled wireless device. As before, this would require normally require connecting to the Internet with the wireless device, opening a chat session application running on the wireless device, re-logging back into the instant messaging service, and initiating a new chat session or selecting an existing chat session to join. However, the present invention enables users such as businessman 10 to transfer a chat session between devices, such as from their land-line computer to a selected Internet-enabled wireless device, in a much simplified manner, as follows.

Figure 1B:
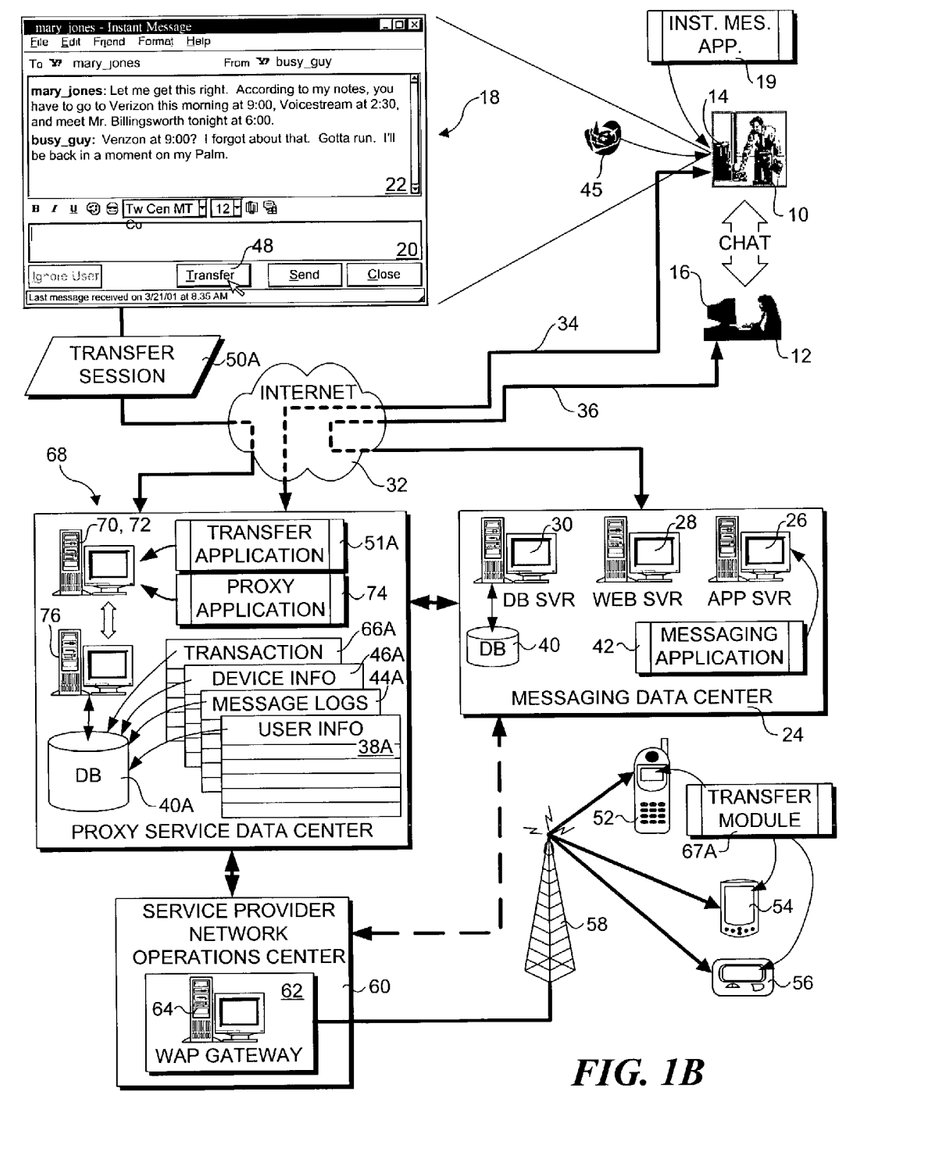
FIG. 1B is a schematic diagram illustrating a second system infrastructure for implanting transfer of a chat session through use of a proxy service.
Figure 2:
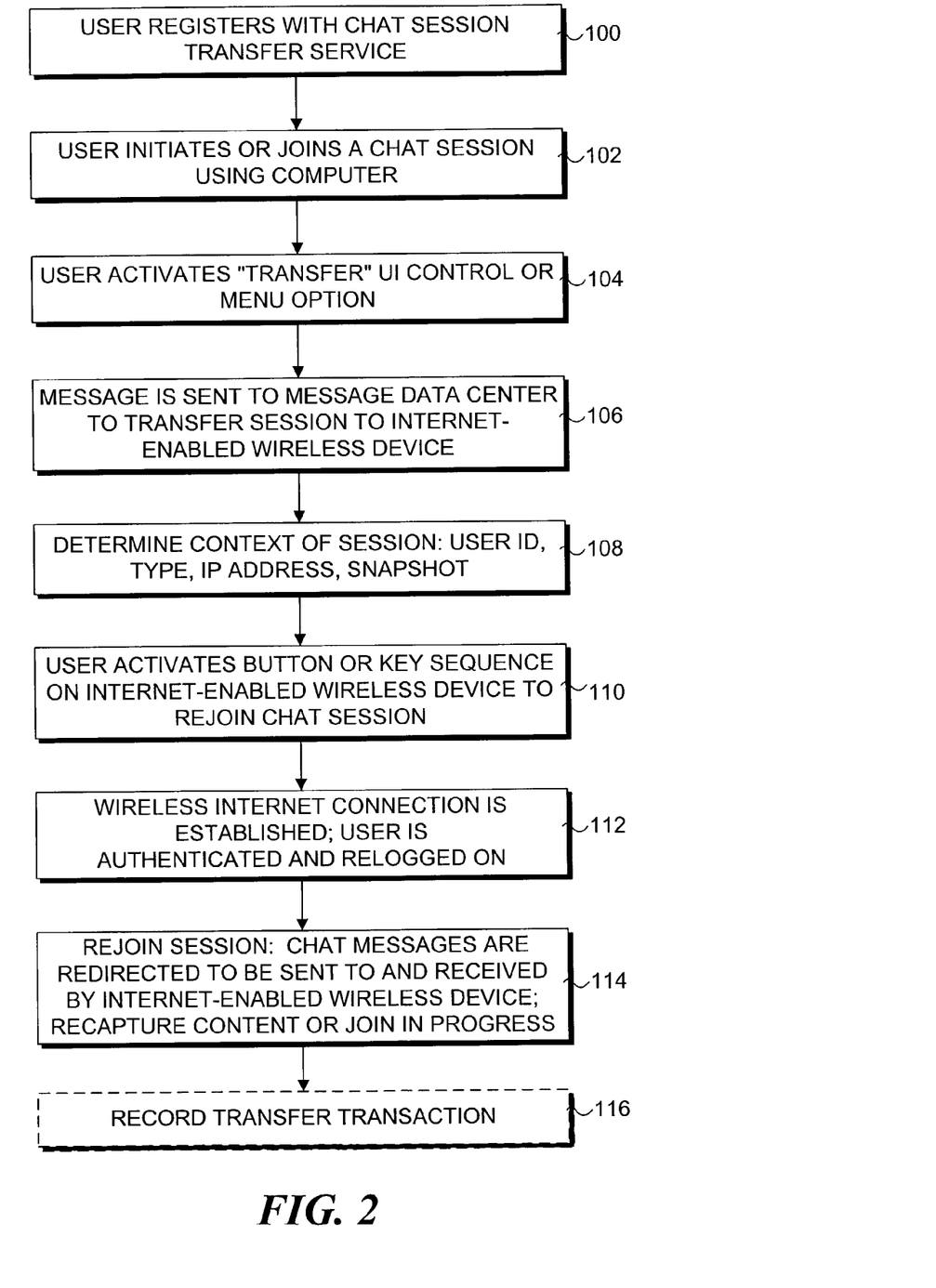
FIG. 2 is a flowchart illustrating the logic used by the present invention when transferring a chat session in accordance with the system infrastructure of FIG. 1A.

As shown in FIG. 2, the process of transferring the chat session begins in a block 100, in which the user registers with a chat session transfer service. As depicted in FIG. 1A, such a chat session transfer service may be provided by the instant messaging service provider via messaging data center 24. As discussed in further detail below and depicted in FIG. 1B, chat session transfer services may also be provided by a third party proxy service. Registration typically will comprises entering pertinent user and device information with the chat session transfer service provider, such as user alias (userID), phone number for an Internet-enabled wireless phone or other type of unique identifier for a user's Internet-enabled wireless device, and optional billing information. This information is then stored in database 40, as depicted by user information table 38 and a device information table 46.

Next, in a block 102, the user initiates or joins a chat session using his or her computer, and participates in the chat session in a conventional manner. As the various participants in the chat session join the session, participant connection information is updated in message log table 44. The user may then choose to transfer the session to a selected Internet-enabled wireless device by activating a "Transfer" user-interface (UI) control or menu item in a block 104, such as a transfer button 48 disposed toward the bottom of instant messaging service application window 18. In addition to activating a UI control or menu option in an instant messaging service application, a similar UI object may be contained within a browser application the user uses to participate in the chat session.

Activation of "Transfer" button 48 causes a transfer session message 50 to be sent to messaging data center 24 in a block 106. If the user has registered more than one Internet-enabled wireless device, a mechanism may be implemented to indicate which wireless device the user desires to transfer the session to. This mechanism could be provided via a menu option and/or UI controls, such as providing a "Send to Phone" or a "Send to PDA" button in lieu of or in addition to "Transfer" button 48. Optionally, upon receiving transfer session message 50, messaging data center 24 could send the user back data that would cause the chat session application to launch a dialog that would enable the user to select which device the user would like the session transferred to. As another option, a user may have multiple devices that are registered, wherein the device to transfer the session to is automatically identified during a subsequent step 112 described below.

Upon receiving transfer message 50, a transfer application 51 running on application server 28 processes the incoming message, which includes determining the context of the computer session in a block 108. This typically will include determining the user's identification (e.g., a userID), the type of computer session the user is participating in (e.g., an instant messaging chat session in the present example), and other parametric information, such as an identity of the wireless device the user desires to transfer the session to and the IP addresses of the land-line computer and the wireless device (if it uses a fixed IP address that is known in advance). The userID and type of computer session can be determined by parsing transfer message 50 and/or by querying message log table 44 and user information table 38. In one embodiment, message log table 44 will include data indicating the IP address of the user, which will be linked to the userID. Accordingly, when transfer message 50 is received, transfer application 51 merely needs to identify the IP address from where the transfer message was sent and query database 40 using the IP address to extract the userID. Optionally, the userID may be encoded within transfer session message 50 or sent using a cookie.

In some instances, determining the context of the session may further comprise taking a "snapshot" of the current activity for the session. The basic idea here is that it is desired to return the user to the point in the session the user left off at when the user rejoins the session on his wireless device. These aspects of determining the context of the session may be obtained by one of several mechanisms. In one embodiment, the ongoing dialog of a chat session may be maintained in database 40 in a separate table (not shown), or as a field (e.g., a BLOB or large varchar field) in message log table 44. Optionally, the context may be obtained via a daemon or background service 45 running on the user's computer (e.g., computer 14), which passes the information to messaging data center 24 in response to the user requesting that the session be transferred. Daemon 45 could keep track of the chat session dialog by parsing the HTML corresponding to the text displayed in textbox 22, or perform "screen scrapping," where an optical character recognition (OCR) algorithm is employed to extract text based on the pixilated bitmap data corresponding to the area on the computer screen in which textbox 22 is displayed.

When convenient, the user will initiate an action to complete the transfer of chat session to the user's Internet-enabled wireless device. Internet-enabled wireless devices that the user might use include a cellular (or PCS) phone 52, a PDA 54, and a pager (e.g., Blackberry pager) 56. Other devices that are not shown but may be used include pocket PCs and laptops that have wireless internet access via wireless modems. If the wireless device is turned off, the user will turn on the device, and instruct the device to connect to its wireless service provider (this generally occurs automatically with cell phones and pagers). If the device is a PDA, such as a Palm device, the user may have to launch an Internet session to connect to the wireless service provider, since Palm devices are typically used for non-wired activities. Once a wireless service connection is established, the user will activate a button or enter a key sequence on the internet-enabled device to rejoin the chat session, as provided by a block 108. On some devices, including PDAs, activation of a hard (mechanical) or soft (e.g., icon) button may launch a wireless internet service connection. Many wireless devices, such as cellular and PCS phones, either provide build-in codes or allow users to code in shortcuts for various functions, such as connecting to the Internet. Such a button or code could be built-in to the device, or programmed in by the user. PDA devices such as Palm Pilots allow users to selectively assign mechanical and soft (icon) buttons to particular functions, such as buttons 57 in FIG. 3.

Suppose businessman 10 rejoins the chat session with a PDA 54. Upon activating a button 57, PDA 54 will attempt to establish a wireless Internet connection via infrastructure provided by the wireless service provider for the PDA, which includes a nearby cellular antenna 58 and a network operations center 60 operated by the service provider.

In the United States, wireless Internet access is typically provided using the Wireless Application Protocol (WAP), which works with WAP-enabled devices. In Asia, the wireless Internet access is generally provided using the I-mode protocol. In order to access data using the I-mode protocol, the wireless device must be an I-mode device, or provide both I-mode and WAP connectivity. Other lesser-used protocols are also used in various parts of the world.

WAP-enabled devices are able to access data from various Internet sites that provide content that is designed to be used by such devices. This data is generally delivered as Wireless Markup Language (WML) data to the device, as described in further detail below. WML comprises a special markup language that is designed to facilitate limited browsing capabilities in consideration of the low-resolution displays and limited navigation capabilities available on today's handheld devices, such as wireless phones, PDAs, and pocket PCs. WML includes HDML (Handheld Device Markup Language), and can trace its roots to XML (extensible Markup Language). It further comprises a Metalanguage that supports user-defined extensions.

WAP-enabled devices are provided access to various web sites that provide wireless Internet content via a WAP gateway (such as WAP gateway 62), which is implemented through the use of one or more WAP gateway servers 64. Generally, respective WAP gateways are operated by the various service providers in areas that support wireless Internet access, although it is possible for service providers to share WAP gateway facilities. In short, a WAP gateway server runs various software modules and/or applications that provide functions for facilitating interaction with WAP-enabled devices, including converting HTML (HyperText Markup Language) data retrieved via HTTP (Hypertext Transport Protocol) from web sites that support wireless Internet content into WML. These functions include a WAP encoder, script compiler and protocol adapters to convert the HTML data into WML.

To create wireless Internet content, a web site must create special text-only or low graphics versions of all or a portion of the pages on its site. At present, only a small fraction of Internet web sites provide wireless Internet content, although the number of these sites is expected to grow exponentially as more and more people acquire WAP-enabled devices. A primary reason for this text-only or low graphics content is that WAP enabled devices generally provide very small low-resolution screens, and typical wireless data transfer rates are much lower than the data-transfer rates available via land-based networks. It is noted that although most present wireless Internet content comprises HTML that must be converted into WML at the WAP Gateway, there are many web sites that provide data that is already in WML directly to the WAP Gateways.

Figure 3:
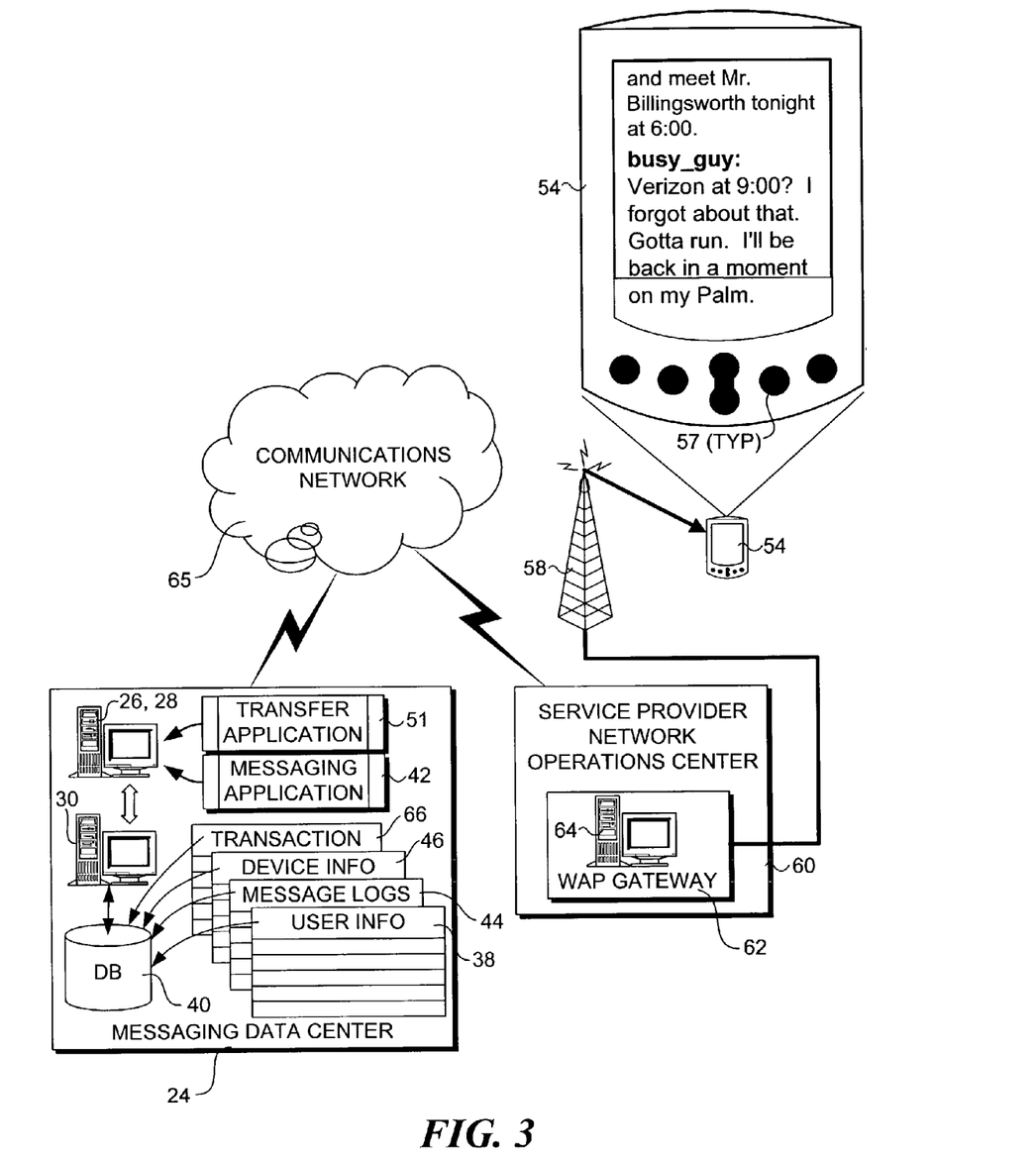
FIG. 3 is a schematic diagram illustrating further details pertaining to the communications between a WAP-enabled wireless device and a instant messaging data center.

A typical WAP session works as follows, with reference to FIG. 3. A user operating a WAP-enabled device, such as PDA 54, opens a "minibrowser" (the WAP client for the session), which then sends out a radio signal via PDA 54's wireless modem searching for WAP service. In response, a connection is made with a service provider the user has a wireless Internet access subscription service with, via a nearby cellular tower 58. The user then selects a web site the user would like to view by entering the URL for the web site through a UI provided by the minibrowser. A request to access the site is then sent from PDA 54 to WAP Gateway 62. A WAP Gateway server 64 retrieves the information corresponding to the URL, typically as HTML data, via HTTP from the web site, and encodes the HTML data into WML (Wireless Markup Language). This data is passed via a communications network 65, such as Internet 32, or a private network. As discussed above, for some Internet sites the data may already be in WML format, so no HTML-to-WML encoding will be required. The WML data is then sent from WAP Gateway server 64 back to PDA 54 via cellular tower 58. In a manner similar to conventional browsing, the user is enabled to browse various pages on the site by activating appropriate UI components presented to the user via the minibrowser, whereby a similar process to that discussed above is performed in response to the user interactions to present content corresponding to that selected by the user.

In accord with the present invention, a mechanism is provided to enable the user to automatically rejoin the session the user transferred from in a greatly simplified manner, such that the user doesn't have to go through the tedious process of connecting to a service provider, entering a URL or opening a chat application, logging back on, etc. Rather, as described above, the user can rejoin the session by simply activating a button or entering a key sequence. Optionally, upon activating the Internet-enabled device, the device may automatically check to see if there is a session the user has requested a transfer from and automatically perform the operations necessary to enable the user to rejoin the session. For example, upon turning on a wireless phone, the phone establishes a connection with the phones wireless service provider, which authenticates the user based on identification information passed to the wireless service provider by the phone. By examining data stored in database 40, such as message logs and user information, messaging data center 24 may determine if the user has either requested transfer from a session, or is currently participating in an ongoing session. Accordingly, the user may be automatically rejoined to the session.

Typically, the transfer functions described herein that are performed by the wireless device will be facilitated by a transfer module 67 running on the device. Optionally, this functionality may be built into the device, either via firmware or hardware.

In one embodiment, as provided by a block 112, when the user activates the button or enters the key sequence, a wireless Internet connection is established, and the user is authenticated and relogged on to the instant messaging service provider. User authentication is provided by identifying the wireless Internet-enabled device based on data stored in device information table 46 and/or user information table 38. For example, pertinent information to establish the identity of a particular device could be stored in device information table 38, which would include a foreign key field that would link the device to the user, whose userID and other user information is stored in user information table 38. Optionally, all of this information could be stored in user information table 38.

The transfer process is completed in a block 144, in which the user is rejoined to the session. This generally comprises redirecting that chat messages so that they are sent to and received from the internet-enabled wireless device instead of the user's land-line computer. Typically, the chat session messages will be redirected from a network address (IP address) corresponding to the land-line computer session to a wireless network address corresponding to the wireless device the session is transferred to.

In addition, the context of the chat session may be "recaptured" such that the user rejoins the session at the point the user left off, based on the previous snapshot that was-recorded. If the chat session comprises an ongoing session involving multiple participants in addition to the user, in may be desired by the user to rejoin the session in its present context rather than the context corresponding to when the user initiated the transfer process. Preferably, the user will be enabled to determine how the session is rejoined based on user preferences stored on database 40, or selection information corresponding to the button or key sequence entered by the user.

In some instances, the transfer service may be a fee-based service, wherein a fee is charged for each session transfer. Optionally, a user may be a fixed monthly fee, or the service may be provided for free by the service provider. Accordingly, as provided by an optional block 116, a record of the transfer service may be recorded in a transaction table 66.

An alternative system infrastructure for implementing the invention is shown in FIG. 1B. As will be readily recognized, the majority of the components of the system infrastructure in FIG. 1B are the same as that shown in FIG. 1A and discussed above, wherein like-numbered components perform substantially the same function in both infrastructures. Of noticeable difference, the infrastructure in FIG. 1B includes a proxy service data center 68, which serves as a proxy that passes through instant message data while extracting information pertaining to the instant messages and their users to enable users to transfer their chat sessions to their wireless devices. Also of note, components having an appended "A" perform similar functions as those components in FIG. 1B that share the same root reference numeral, with the differences correspond to use of the proxy services provided by the system.

In one embodiment, users that desire to have the option of transferring their chat sessions will initiate or join a chat session by first connecting to proxy service data center 68 via their browser or via their instant messaging client application 19. Typically, the user will be authenticated by proxy service data center 68 via a logon process. The user may directly log onto the proxy service, or the proxy service may extract logon information from the data it passes through, as described in further detail below.

Preferably, from the perception of both users and messaging data center 24, proxy service data center 68 functions as a substantially invisible pass-through. In other words, users still send and receive messages via messaging data center 24 in substantially the same manner as described above, except that such information is passed through proxy service data center 68. For example, while participating in a chat session, messages received from a proxy service user are passed through proxy service data center 68 and received by messaging data center 24, whereupon they are handled in a manner similar to that described above. On the flip side, messages received by the user are sent from another participant, received and processed by messaging data center 24, passed through proxy services data center 68, and forwarded to the user.

In further detail, messages sent from users are received by proxy services data center 68 via a web server 70, which also functions as an application server 72. Optionally, web server 70 and application server may comprise separate machines, or each may comprise multiple machines. A proxy application 74 running on application server 72 receives the incoming data and processes the data to determine how it should be handled. For example, during a connection initialization process, proxy application 74 may receive information pertaining to the instant messaging server the user wishes to use. It is necessary to know the IP address of the instant messaging service server in order to pass through the message data sent from the user to the instant messaging service the user desires to access. In one embodiment, the instant messaging service(s) used by a user is/are stored in a user information table 38A that is part of a database 40A. The IP addresses for the instant messaging servers for these messaging servers are also stored in database 40a, and are retrieved via a database server 76 when the user connects to the proxy service.

In one embodiment, proxy service data center 68 may emulate a "pseudo" user to enable the pass through functionality discussed above. That is, proxy application 74 creates an internal user for each proxy service user, whereby the internal user directly communicates with messaging data center 24. Preferably, the internal user will share the same user alias as the actual user so that other chat participants may send messages to and receive messages from the user through use of the users normal user alias.

In one embodiment, the proxy infrastructure works in the following manner. A user, such as businessman 14 first signs up with the transfer service provided by proxy service data center 68. The sign up process will typically comprise entering various user information, including a userID and password, which may be the same as the userID and password the user uses when using his normal instant messaging service. The user will also identify one or more instant messaging services the user plans on using, along with user alias and password information for each of these services. During the sign up process, the user may be requested to download an instant messaging client application 19A or a plug-in that works with the user's existing instant messaging client application or Internet browser client. (These programs/modules may optionally be sent to the user via mail). The downloaded client application/plug-in will be used to redirect the client to route messages through proxy service data center 68 rather than directly route the messages to the instant messaging service's messaging data center 24. Preferably, the instant messaging client will appear to the user to function the same as the user's existing instant messaging client, except for features corresponding to the transfer of chat sessions. Similarly, in instances where browser plug-ins are used, the browser's instant messaging client interface will function in substantially the same manner as a normal browser-based instant messaging client. In the following paragraphs it will be presumed that the user is using an instant messaging client application, although it will be readily apparent to those skilled in the art that similar functionality may be implemented in a browser-based instant messaging client.

Figure 4:
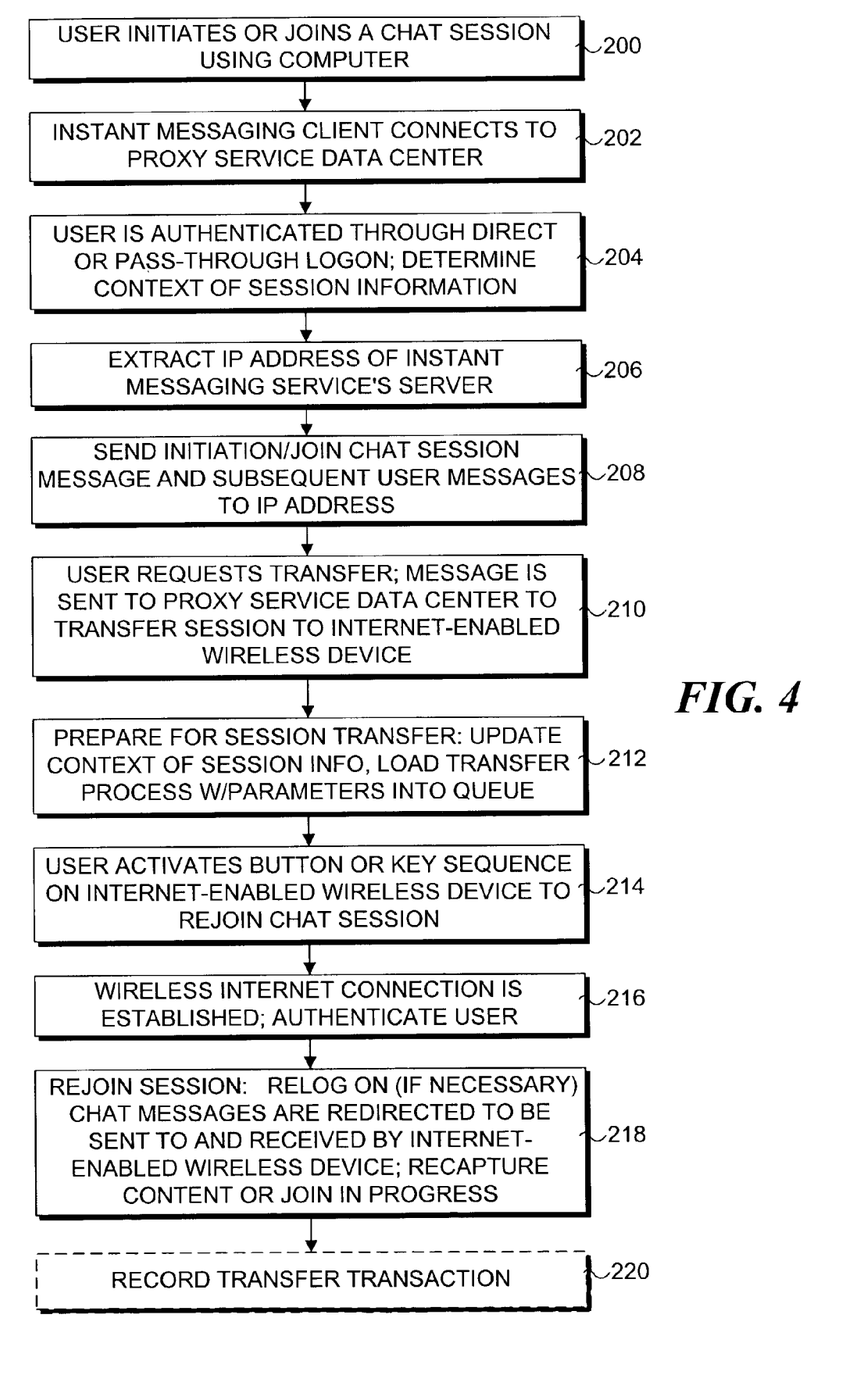
FIG. 4 is a flowchart illustrating the logic used by the present invention when transferring a chat session in accordance with the system infrastructure of FIG. 1B.

With reference to a block 200 in the flowchart of FIG. 4, the session transfer process begins with the user initiating a chat session or joining a chat session using a land-line computer. From the user's perspective, this will encompass substantially the same tasks as discussed above with reference to block 102 in FIG. 2. The instant messaging client will then send a message to proxy service data center 68 to establish a connection in a block 202. In order to initiate a new chat session or join a session already in progress, proxy service data center 68 will have to send an appropriate request and user identification data to the user's instant messaging service data center. This may comprise part of the user authenticated process performed in a block 204, or the user authentication process may be performed separately. The user may typically be authenticated by user alias and password information passed to proxy data service 68 by instant messaging client 19A. Optionally, for users that user fixed IP addresses (or otherwise known network locations), the user may be authenticated by examining the IP address from where the message was sent. These messages will typically be sent as HTTP packets (or similar types of packets) using a standard network protocol, such as TCP/IP.

Also in block 204, the context of the chat session is determined. This information typically will be provided by instant messaging client 19A. Optionally, this information may be extracted from messages sent from and received by the user as they pass through proxy service data center 68. This session context information is then stored in a message logs table 44A.

Upon establishing the connection and authenticating the user, proxy application 74 will query database 40A to determine the IP address of the user's instant messaging service, as provided by a block 206. This will typically be done using the user's userID, which will be keyed to various data in database 40A. Optionally, this information may be passed to the proxy service data center from instant messaging client 19A. A message to initiate or join the chat session is then sent to web server 28 using the IP address in a block 206. After the user has initiated or joined the chat session, which will be hosted by messaging data center 24 as before, subsequent messages sent and received by the user will pass through proxy service data center 68. Conversely, other chat session participants that do not use the proxy service will interact with messaging data center 24 in the normal manner discussed above, without being passed through proxy service data center 68. After the user has initiated or joined the chat session, they user may desired to transfer the session to the user's Internet-enabled wireless device. From the user's perspective, this can be performed in substantially the same manner discussed above with respect to discussion of the infrastructure of FIG. 1A. In a block 210, the user activates "Transfer" button 42 on instant messaging client window 18 to request transfer of the session to a selected Internet-enabled wireless device, causing a transfer session message 50A to be sent from the instant messaging client to proxy service data center 68. In a block 212, proxy service data center 68 receives the message and prepares for transferring the session by updating the context of the session and storing the information in message log table 44A.

In addition, relevant transfer information (e.g., IP address of wireless device or other device identification, context information, messaging data center information, etc.) may be stored in a queue in database 40 to perform a subsequent session transfer in response to receiving a transfer signal. For example, in an Oracle 8i database, a transfer procedure with preloaded parameters may be loaded into a process queue that will automatically run the procedure when it receives a triggering event. Transfer functions are performed by a transfer application 51A running on application server 72. It is noted that some IP address are dynamically allocated to wireless device users. In such instances, the IP address of the wireless device will not be available until the user establishes an Internet connection on the wireless device.

In a block 214, the user activates a button or key sequence on the Internet-enabled wireless device to rejoin the chat session in a manner similar to that discussed above with reference to block 110 in FIG. 2. As before, a wireless Internet connection is established via network operations center 60, and the user is authenticated in a block 214. In most instances, the user will be authenticated by forwarding a reconnect message to proxy service data center. For wireless phones, authentication may be performed by identifying the phone number of the wireless device, which was previously stored in a device information table 46A during the sign on process, and extracting the user's userID from the table based on the phone number. For wireless PDA's, laptops, and pocket PCs, user authentication may require the user to send identification (e.g., userID and password). Optionally, this information may be sent by the microbrowser running on the PDA or pocket PC in the form of a cookie or similar data message.

In a block 218, the user is rejoined to the chat session, which effectively transfers the context of the land-line chat session the user was previously participating in to a new chat session client running on the user's wireless device. In one embodiment, transfer of the chat session to the user's wireless device will be handled transparently by proxy service data center 68. What this means is that messaging data center 24 will not be aware a transfer has even occurred. Chat session messages will continue to be sent to and from messaging data center 24 using the userID that was used to initially connect the user to the chat session. In an alternative embodiment, the user will be reconnected to the chat session via messaging data center 24. In this instance, the user will need to relog on to the messaging data center by entering his userID and password. This may be automatically performed by the user's wireless device (through a transfer session software module 67A running on the device), or by sending appropriate information from proxy service data center 68. Depending on the user's preference, the chat session may be rejoined to recapture the context of the session at the point the user left the session (via the snapshot), or the session may be rejoined in progress. The transfer session process is completed in a block 220, wherein a transfer session transaction record may be optionally recorded.

There are many variations that may be applied to the infrastructures of FIGS. 1A and 1B. For example, with respect to the infrastructure of FIG. 1B, a portion of the transfer functions could be performed by messaging data center 24. In some embodiments, it may be desired to maintain a land-line connection to a session until after the user has joined the session with the user's wireless device. In other embodiments, the user may initiate the transfer process by attempting to join the chat session with the user's wireless device while still connected to the chat session using his land-line device. When the user tries to join the session using his userID, the transfer application will look at data in message log table 44 (or 44A) to determine if the user is already a participant in the chat session. If the user is already a participant, the transfer application will recognize that the user desires to transfer the session to the user's wireless device.

In addition to transferring session from a land-line device to a wireless device, the present invention may be implemented to transfer the session back to a land-line device, transfer a session that was originated from a wireless device to a land-line device, or transfer a session between two wireless devices. In the case of transferring from a wireless device to a land-line device, the transfer process may be performed using an infrastructure substantially similar to that depicted in FIGS. 1A and 1B in a manner substantially similar to that described above, except the various identification, software module functions, and proxy pass through functions are reversed.

In addition to transferring chat sessions, the principles, methods, and techniques described above may be adapted to transfer other online computer sessions, such as an e-mail session, an online stock brokerage session, or a shopping session via an online retailer. For example, suppose a user is drafting an e-mail message. The present invention could enable the user to transfer the e-mail session to a wireless device in a manner that would not require the user to save the draft, relog on to the e-mail server, etc. Rather, upon connecting to his wireless Internet service provider, the e-mail client for the wireless device could be automatically opened with the draft of the e-mail message automatically loaded.

A similar online session transfer process could be applied to online brokerage session and shopping sessions. In the case of an online brokerage session, session context information could be stored at either the brokerage site or via a proxy service. This information might include a list a stocks a user is following in realtime, data entered for making a trade that has yet to be completed, and other data pertaining to a user's session with the online brokerage site. Likewise, shopping session context information, such as shopping cart contents, items a user has browsed during a session, partially completed purchase information, etc., could be stored in a database operated by the online retailer or via a proxy service. This information could then be used to transfer the context of a land-line session to a new wireless session in a manner similar to that described above for transferring a chat session.

Figure 5:
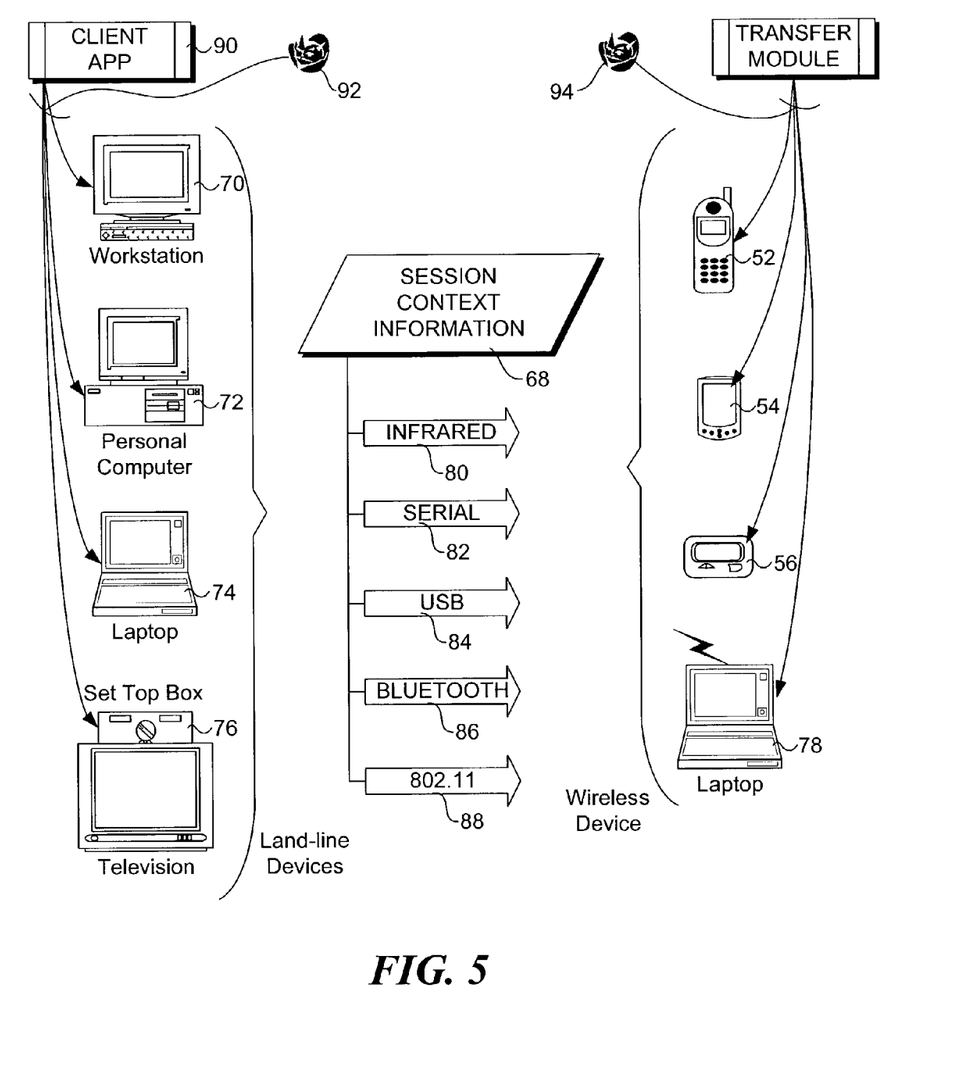
FIG. 5 is a schematic diagram illustrating the transfer of a computer session between devices using a peer-to-peer communications link.

In addition to transferring session context information in the manners discussed above, such information may also be passed via a peer-to-peer communications link. For instance, as shown in FIG. 5, session context information 68 corresponding to a computer session running on a land-line device such as a workstation 70, a personal computer 72, a laptop 74, or a set top box 76 (e.g., WebTV) may be transferred to a wireless device such as wireless phone 52, wireless PDA 54, pager 56, or a laptop 78 with a wireless modem using an infrared link 80, a serial link 82, a USB (universal serial bus) link 84, a Bluetooth wireless link 86, or an 802.11 wireless link 88. If a Bluetooth or 802.11 wireless link is used, the land-line device will need to include wireless communication capabilities that support the Bluetooth and 802.11 wireless protocols.

Typically, a session context peer-to-peer transfer will be facilitated by software running on both the sending and receiving devices. In one embodiment, session transfer functionality may be built into a client application 90 that provides user-interface controls to enable a user of the client application to selectively transfer a session to a wireless device. Optionally, such functionality may be performed by a plug-in or a daemon 92 running on the land-line device. Similarly, a transfer module 67B running on the wireless device may be used to facilitate the peer-to-peer transfer at the receiving end. Optionally, such functionality may be encoded into firmware for the wireless device, or may comprise a daemon 94.

Figure 6:
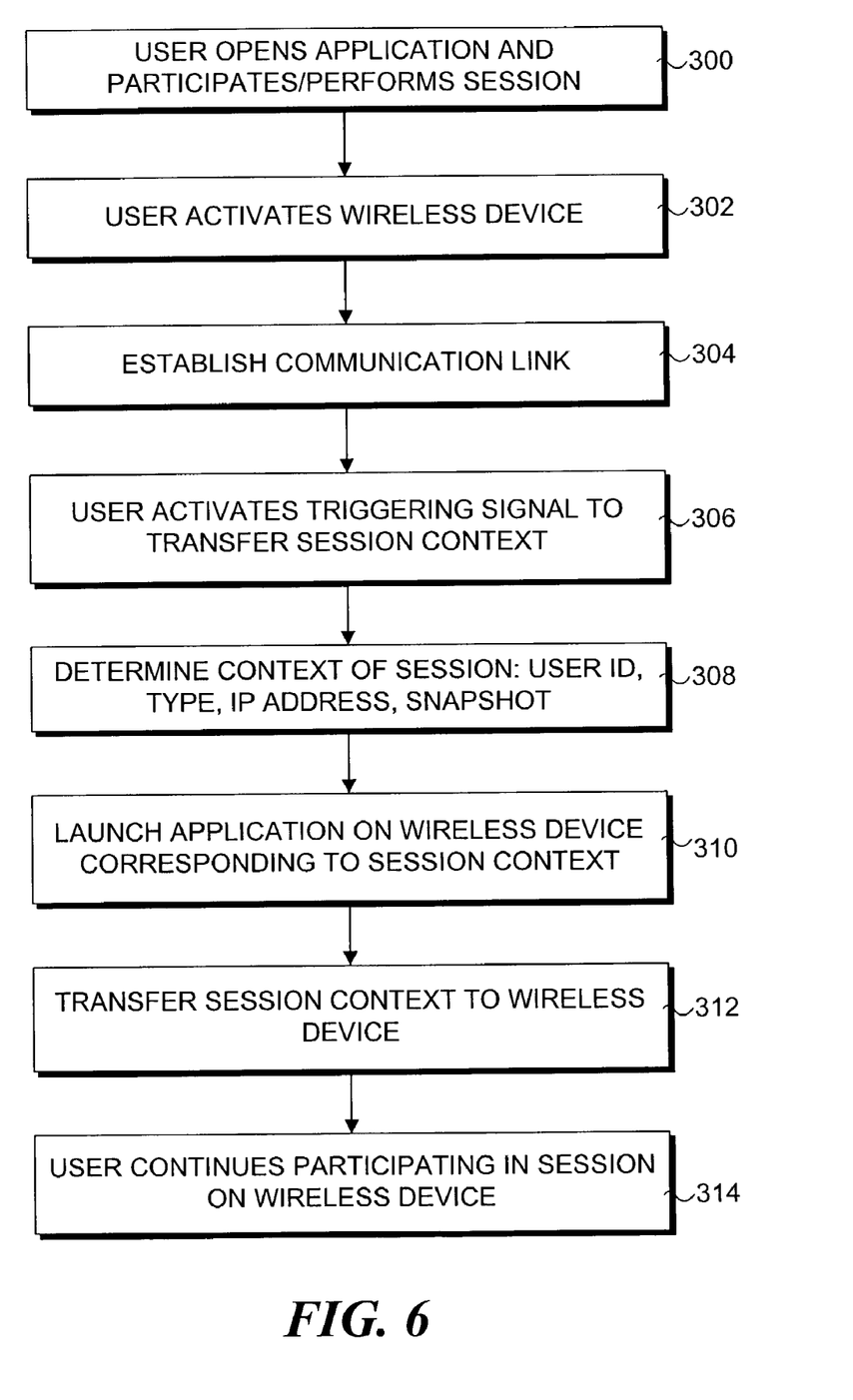
FIG. 6 is a flowchart illustrating the logic used by the present invention when transferring a computer session using a peer-to-peer communications link.

With reference to the flowchart of FIG. 6, The peer-to-peer session context transfer may be performed as follows. In a block 300, the user will open up an application on the land-line device and participate in a computer session supported by the application. Upon desiring to transfer the session, the user will activate the wireless device (if it isn't already turned on) in a block 302, and establish a peer-to-peer communication link between the two devices in a block 304. In a block 306, the user activates a triggering signal to transfer the session context. This can be performed by application of a UI button or menu option provided by the application running on the land-line device (or via a plug-in or browser that interfaces with the application), or it may be performed by application of a hard or soft key or key sequence on the wireless device.

Upon activation of the triggering signal, the context of the session is determined in a block 308. Typically, the context information may be extracted by client application 90 or daemon 92. Based on the context information, which will include the type of session the user is participating in, a corresponding application will be automatically launched on the user's wireless device. For example, if the user is participating in a chat session or e-mail session, a corresponding instant messaging or e-mail application will be launched on the wireless device. In many instances, the computer session will be an online session, which will also require a wireless network (e.g., Internet) connection to be established in addition to launching the application. As before, this process will be performed automatically. Session context information may then be transferred in a block 312. Optionally, this information may be transferred prior to block 310, as at least a portion of the session context information will need to be transferred to the wireless device in order for the proper application to be launched. After the session context information has been transferred, the user may then continue participating in the session on the wireless device, as provided in a block 314.

Notably, the embodiment shown in FIG. 5 enables the transfer of both online and offline computer sessions to be transferred. Examples of offline computer session include preparing documents with a word processing, spreadsheet documents, and drafting e-mail messages offline.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive. Furthermore, it is not intended that the scope of the invention in any way be limited by the above description, but instead be determined entirely by reference to the claims that follow.

What is claimed is:

1. A hardware-based machine-implemented method for transferring a computer session from a first device to a second device, comprising:
    enabling a user to initiate a computer session via the first device, the computer session facilitated via a first communication link between the first device and a third device accessed over a network;
    enabling the user to selectively initiate a transfer of the computer session to the second device;
    establishing a second communication link between the first device and the second device; and
    enabling the computer session to be continued on the second device by employing the first device as a proxy for the second device through use of the first and second communication links, wherein after transferring the computer session to the second device communications between the second device and the third device are routed through the first device via the first and second communication links.

2. The method of claim 1, further comprising:
    in response to a user input, receiving a triggering signal from the second device at the first device to transfer the session; and
    transferring the computer session to the second device in response to the triggering signal.

3. The method of claim 2, wherein the triggering signal is sent in response to the user activating a hard or soft button or entering a key sequence on the wireless device.

4. The method of claim 1, wherein a client side of the computer session is hosted by an application program running on the first device and the user is enabled to initiate the transfer of the computer session by activating a user-interface control or menu option provided by the application program.

5. The method of claim 1, wherein the computer session corresponds to an online session hosted by an online service provider, and wherein proxy operations are performed by the first device in a manner that is transparent to the online service provider such that the online service is unaware a transfer of the computer session has occurred.

6. The method of claim 1, wherein the second communication link comprises a peer-to-peer communication link between the first device and the second device.

7. The method of claim 6, wherein the peer-to-peer communication link is a direct link between the first device and the second device comprising one of an infrared link, a serial link, a universal serial bus link, a wireless Bluetooth link or a wireless 802.11 link.

8. The method of claim 1, wherein the third device comprises a network server that is accessed via the Internet using the first communication link.

9. The method of claim 1, wherein the third device comprises a network server that hosts at least one of an application or service associated with the computer session.

10. The method of claim 1, further comprising:
    determining a context of the computer session on the first device; and
    transferring session context information corresponding to the context of the computer session on the first device from the first device to the second device via the second communication link,
    wherein the session context information is configured to enable, in part, the computer session to be continued on the second device when implemented by the second device.

11. The method of claim 10, wherein the second device is a wireless device, and wherein transferring the computer session to the wireless device automatically performs the functions of:
    opening an application that enables a computer session corresponding to the computer session on the first device to be hosted on the wireless device;
    establishing a wireless Internet connection;
    employing the wireless Internet connection as part of the second communication link; and
    loading the application with data associated with the session context information such that the context of the computer session is transferred to the wireless device.

12. The method of claim 11, wherein the functions are automatically performed in response to the user activating a hard or soft button or entering a key sequence on the wireless device.

13. The method of claim 10, wherein determining the context of the computer session further comprises acquiring a snapshot of computer session as it is being performed on the first device, and wherein transferring the context of the session to the second device returns the user to a point in the computer session at which the snapshot was acquired.

14. The method of claim 1, wherein the method operations are facilitated, at least in part, via execution of software on at least one of the first or second devices.

15. A computer-readable storage medium having instructions stored thereon to perform operations when executed comprising:

enabling a user to selectively initiate a transfer of a computer session running on a first device to a second device, the computer session facilitated via a first communication link between the first device and a third device accessed via a network;

establishing a second communication link between the first device and the second device;

enabling the computer session to be continued on the second device by employing the first device as a proxy for the second device through use of the first and second communication links, wherein after transferring the computer session to the second device communications between the second device and the third device are routed through the first device via the first and second communication links.

16. The computer-readable storage medium of claim 15, wherein a client side of the computer session is hosted by an application program running on the first device and execution of the instructions on the first device further enables the user to initiate the transfer of the computer session by activating a user-interface control or menu option associated with the application program.

17. The computer-readable storage medium of claim 15, wherein the computer session corresponds to an online session hosted by an online service provider, and wherein the proxy operations are performed by the first device in a manner that is transparent to the online service provider such that the online service is unaware a transfer of the computer session has occurred.

18. The computer-readable storage medium of claim 15, wherein execution of the instructions on the first device perform further operations comprising:

setting up a peer-to-peer communication link between the first device and the second device comprising the second communications link.

19. The computer-readable storage medium of claim 15, wherein the third device comprises a network server that hosts at least one of an application or service associated with the computer session.

20. The computer-readable storage medium of claim 15, wherein execution of the instructions further performs operations including:

determining a context of the computer session on the first device; and transferring session context information corresponding to the context of the computer session on the first device from the first device to the second device via the second communication link, wherein the session context information is configured to enable, in part, the computer session to be continued on the second device when implemented by the second device.

21. The computer-readable storage medium of claim 20, wherein execution of the instructions further performs operations including:

receiving a triggering signal from the second device indicating the user is ready to transfer the session; and transferring the session context data to the second device in response to the triggering signal.

22. The computer-readable storage medium of claim 20, further including instructions to be executed on a second device comprising a wireless device to perform operations comprising:

opening an application that enables a computer session corresponding to the computer session on the first device to be hosted on the wireless device;

receiving session context data from the first device; and loading the application with context data such that the context of the computer session is transferred to the wireless device.

23. The computer-readable storage medium of claim 22, wherein the operations are automatically performed in response to the user activating a hard or soft button or entering a key sequence on the wireless device.

24. The computer-readable storage medium of claim 20, wherein determining the context of the computer session further comprises acquiring a snapshot of the computer session as it is being performed on the first device, and wherein transferring the context of the session to the second device returns the user to a point in the computer session at which the snapshot was acquired.

25. The computer-readable storage medium of claim 15, wherein the third device comprises a network server that is accessed via the Internet using the first communication link.

26. The computer-readable storage medium of claim 15, wherein the third device comprises a network server that hosts at least one of an application or service associated with the computer session.

27. A hardware-based machine-implemented method for transferring a chat session from a first device to a second device, comprising:

performing, in response to user input, one of launching a new chat session or joining an existing chat session via the first device, the chat session facilitated via a first communication link between the first device and one of an instant messaging service host or a chat session peer;

enabling a user to selectively initiate a transfer of a chat session from the first device to the second device;

establishing a second communication link comprising a peer-to-peer communication link between the first device and the second device;

determining a context of the chat session on the first device; and transferring session context data corresponding to the context of the chat session on the first device from the first device to the second device via the peer-to-peer communication link, the session context data configured to enable, in part, the computer session to be continued on the second device when implemented by the second device;

enabling the computer session to be continued on the second device by employing the first device as a proxy for the second device through use of the first and second communication links, wherein after transferring the computer session to the second device communications between the second device and the instant messaging service host or a chat session peer are routed through the first device via the first and second communication links.

28. The method of claim 27, wherein the second device is a wireless device, the method further comprising:

opening a chat session application or browser that supports access to an instant messaging service associated with the chat session on the wireless device; and loading the chat session application or browser with context data associated with the session context data such that the context of the chat session is transferred to the wireless device.

29. The method of claim 28, wherein the operations are automatically performed in response to the user activating a hard or soft button or entering a key sequence on the wireless device to request transfer of the chat session.

30. The method of claim 28, further comprising:
redirecting outbound messages from the second device intended for the instant messaging service host to the first device in a manner that is transparent to the chat session application or browser.

31. The method of claim 27, wherein the user is enabled to initiate the transfer of the chat session by activating a user-interface control or menu option associated with the chat session application or browser.

32. The method of claim 27, wherein the proxy operations are performed by the first device in a manner that is transparent to the instant messaging service host such that the instant messaging service host is unaware a transfer of the computer session has occurred.

33. The method of claim 27, wherein determining the context of the chat session further comprises acquiring a snapshot of the chat session as it is being performed on the first device, and wherein transferring the context of the session to the second device returns the user to a point in the chat session at which the snapshot was acquired.

34. The method of claim 27, wherein the peer-to-peer communication link comprises a direct link between the first device and the second device comprising one of an infrared link, a serial link, a universal serial bus link, a wireless Bluetooth link or a wireless 802.11 link.

35. The method of claim 27, wherein the method operations are facilitated, at least in part, via execution of software on at least one of the first or second devices.

36. A computer-readable storage medium having instructions stored thereon to facilitate transfer of a chat session from a first device to a second device when executed on the first device via operations comprising:
enabling a user to selectively initiate a transfer of a chat session running on the first device to the second device, the chat session facilitated via a communication link between the first device and one of an instant messaging service host and a chat session peer;
determining, via the first device, a context of the chat session on the first device;
establishing a second communication link between the first device and the second device;
transferring context data corresponding to the context of the chat session from the first device to the second device; and
enabling the chat session to be continued on the second device by employing the first device as a proxy for the second device, wherein after transferring the computer session to the second device communications between the second device and the instant messaging service host or the chat session peer are routed through the first device via the first and second communication links.

37. The computer-readable storage medium of claim 36, wherein the second device is a wireless device, further comprising instructions to be executed on the wireless device to perform operations comprising:
opening a chat session application or browser that supports access to an instant messaging service associated with the chat session on the wireless device; and
loading the chat session application or browser with the context data such that the context of the chat session is transferred to the wireless device.

38. The computer-readable storage medium of claim 37, wherein the operations are automatically performed in response to the user activating a hard or soft button or entering a key sequence on the wireless device to request transfer of the chat session.

39. The computer-readable storage medium of claim 37, further comprising instructions to be executed on the wireless device to redirect outbound messages intended for the instant messaging service host to the first device in a manner that is transparent to the chat session application or browser.

40. The computer-readable storage medium of claim 36, further comprising instructions to be executed on the first device to enable a user to initiate the transfer of the chat session by activating a user-interface control or menu option associated with a chat session application or browser used as a chat session client.

41. The computer-readable storage medium of claim 36, wherein the proxy operations are performed by the first device in a manner that is transparent to the instant messaging service host or the chat session peer such that the instant messaging service host or the chat session peer is unaware a transfer of the chat session has occurred.

42. The computer-readable storage medium of claim 36, wherein determining the context of the chat session further comprises acquiring a snapshot of chat session as it is being performed on the first device, and wherein transferring the context of the session to the second device returns the user to a point in the computer session at which the snapshot was acquired.

* * * * *